United States Patent [19]

Colledge

[11] 4,104,429

[45] Aug. 1, 1978

[54] BRANDED WOOD BASED COMPOSITION BOARD PRODUCT

[76] Inventor: Gary C. Colledge, P. O. Box 2178, Newport Beach, Calif. 92663

[21] Appl. No.: 767,055

[22] Filed: Feb. 9, 1977

Related U.S. Application Data

[63] Continuation-in-part of Ser. No. 598,772, Jul. 29, 1975, Pat. No. 4,007,767.

[51] Int. Cl.[2] .............................................. B32B 21/06

[52] U.S. Cl. .................................... 428/151; 428/528; 428/529; 428/535; 428/537

[58] Field of Search ............... 428/151, 528, 529, 530, 428/531, 535, 537, 172

[56] References Cited

U.S. PATENT DOCUMENTS

| | | | |
|---|---|---|---|
| 1,180,516 | 4/1916 | McIndoe | 428/151 |
| 3,294,014 | 12/1966 | Kneisel | 101/8 |
| 3,542,641 | 11/1970 | Showalter | 428/151 |

*Primary Examiner*—Marion E. McCamish
*Attorney, Agent, or Firm*—Warren, Chickering & Grunewald

[57] ABSTRACT

A wood based composition board product, either hardboard, particleboard or fiberboard, having an intricate pattern of recesses formed in the relatively hard outer surface of the product is disclosed. The recesses are charred to discolor the same, and the pattern is preferably a wood grain simulating pattern.

4 Claims, 2 Drawing Figures

BRANDED WOOD BASED COMPOSITION BOARD PRODUCT

RELATED APPLICATION

This application is a continuation-in-part application of my copending application Ser. No. 598,772, filed Jul. 24, 1975, entitled "HIGH SPEED ROTARY BRANDING PROCESS HAVING INCREASED DIE LIFE," issued on Feb. 15, 1977 as U.S. Pat. No. 4,007,767.

BACKGROUND OF THE INVENTION

My copending application Ser. No. 598,772 is a continuation-in-part application based upon application Ser. No. 440,481, filed on Feb. 7, 1974 and entitled HIGH TEMPERATURE, LOW PRESSURE AND HIGH SPEED WOOD GRAIN EMBOSSING PROCESS, which application is now abandoned, but which application was in turn a divisional application of application Ser. No. 216,061, filed Jan. 7, 1972 and entitled HIGH SPEED, HIGH TEMPERATURE EMBOSSING MACHINE AND WHEEL THEREFOR, issued as U.S. Pat. No. 3,730,081 on May 1, 1973 with the title ROTARY HOT DIE EMBOSSER WITH TAPERED SHAFT AND INSULATED EMBOSSING WHEEL.

Prior Art

Highspeed rotary embossing apparatus have previously been devised which are particularly well suited for use in the embossing of relatively deep decorative patterns in relatively soft wooden molding for furniture, picture frames and the like. Such apparatus employs a very hot die (1,000° to 1,200° F. or more) under a substantial pressure to emboss patterns which may have a depth of $\frac{1}{4}$ inch or greater into lumber that is usually relatively soft at high speeds (for example, 200 feet per minute). U.S. Pat. Nos. 3,730,081 and 3,764,767 typify such prior art apparatus, and the product produced therefrom is soft lumber with a deep coarse pattern branded therein.

In addition to embossing wood molding, it has long been desirable to be able to emboss a wood grain pattern on sheets or panels of wooden materials having poor grain characteristics. Such embossing of wooden panels has been accomplished to a limited degree by the apparatus of U.S. Pat. Nos. 2,703,463 and 2,695,857 which employ low temperature, low speed, high pressure processes. The resultant product is a relatively soft wooden panel, such as a plywood or the like.

U.S. Pat. No. 3,294,041 discloses a process in which a die having a pattern of protrusions of substantial height simulating wormholes is heated to a high temperature and urged against a wooden product, usually a panel, at a very high pressure. A similar process is shown in U.S. Pat. No. 3,393,294 in which wormholes are formed by contacting the wooden panel over a substantial period of time by using an endless-tract mounting of the heated protruding elements. U.S. Pat. No. 2,202,110 also teaches the use of hot blades to incise or cut soft woods such as Douglas fir.

In addition, cold dies have been employed with very substantial pressures to attempt to crush or impress a wood grain pattern into a wooden article. Even when relatively soft wood is employed, this approach results in chipping and fracturing of the wood fiber, poor grain definition, slow speed and an inability of the impressed grain to visually stand out from the remainder of the wood with a corresponding need to use inks or color fillers to bring out the grain.

In addition to branding or embossing a pattern onto panels and molding, printing processes have been employed in which ink is imprinted onto the article in a wood grain pattern. In this process, the finish of the panel is controlled by the grain printer, and the manufacturer of the article must attempt to match other wood to the finish of the printed wood. Sanding or other refinishing of wood grain printed products is impossible.

Although much has been done with wooden moldings and panels, no one has ever attempted to emboss a wood grain pattern into composition board such as hardboard, fiberboard and particleboard. The primary reason has been the extreme surface hardness exhibited by such materials. All of these composition boards have been found to have the advantages of good strength and low cost, but they have the disadvantages of having relatively hard, and in some cases extremely hard, outer surfaces and absolutely no grain pattern. The lack of grain pattern has limited use of these composition products to non-decorative applications, and the hard surfaces have limited the ability to add decorative patterns.

The hard surfaces of such composition board products has heretofore caused embossing of intricate wood grain patterns, either by hot or cold dies, to be ruled out as impossible or impractical. It is theoretically possible to cast a pattern into composition boards during manufacture, but there would seem to be substantial practical problems with such an approach in light of the fact that no such product is commercially available. Moreover, such a cast product would still have to be flooded with an ink or die to color the cast recesses forming the pattern. In any event, no manufacturer has ever produced branded hardboard, fiberboard or particleboard.

OBJECTS OF THE INVENTION

It is an object of the present invention to provide a new composition board product which can be employed as a decorative element in the manufacture of furniture, doors, panels and other structures.

It is a further object of the present invention to provide a new composition board product having a decorative wood grain pattern therein which can be finished and refinished to match other components.

Another object of the present invention is to provide a branded composition board product which is durable, can take a wide variety of shapes and sizes, has greater versatility of use and is inexpensive to manufacture.

Other objects and features of advantage of the branded wood based composition board product of the present invention will become apparent from or are set forth in detail in the accompanying drawing and the following description of the preferred embodiment.

SUMMARY OF THE INVENTION

The wood based composition board product of the present invention is comprised, briefly, of a solid body formed of wood based components held together by binder means and having a relatively hard outer surface, and an intricate pattern of recesses formed in said outer surface with substantially all of the recesses being charred to produce a discolored appearance as compared to the color of the surface intermediate the recesses. The body of the composition board is formed as hardboard, particleboard or fiberboard.

DESCRIPTION OF THE PREFERRED EMBODIMENTS

The wood based composition board product of the present invention is formed with a solid body having wood based components which are held together by binder means. The wood based composition board can be divided into three categories, namely, hardboard, fiberboard and particleboard.

Hardboard is a composite product that is made by compressing shredded wood chips together under very high pressure and usually at high temperature with a binder. Sometimes the hardboard is tempered for increased surface hardness, and usually hardboard has a thickness which is in the range of about 6 to 9 millimeters. Hardboard has a high strength and high surface smoothness.

Fiberboard is a composite board which is made by compressing fibers, as opposed to discrete chips or particles, together under high temperature and pressure in the presence of a binder. Fiberboard has a somewhat less particulate appearance than hardboard, but can be formed with extreme surface hardness and is usually relatively smooth.

Particleboard, sometimes also referred to as chipboard, is made from discrete particles or chips of wood as is hardboard. Usually the chips are somewhat coarser than hardboard and are held together by a binder during curing which is at lower temperatures and pressures than hardboard. Particleboard is less dense, has greater surface roughness, and has a greater variation in the hardness of the surface due to the larger chip sizes and lower density of the board. Particleboard, however, often comes is very thick sections and can take a wide variety of forms other than sheets or panels.

Figure 1:
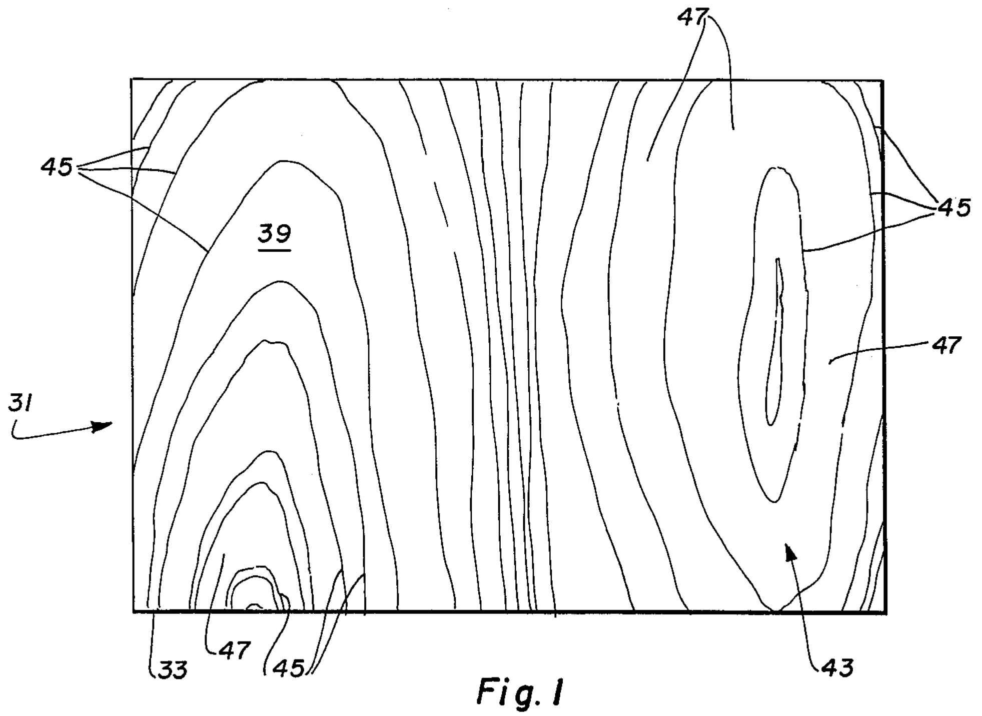
FIG. 1 is a top plan view of a branded wood based composition board product constructed in accordance with the present invention.
Figure 2:
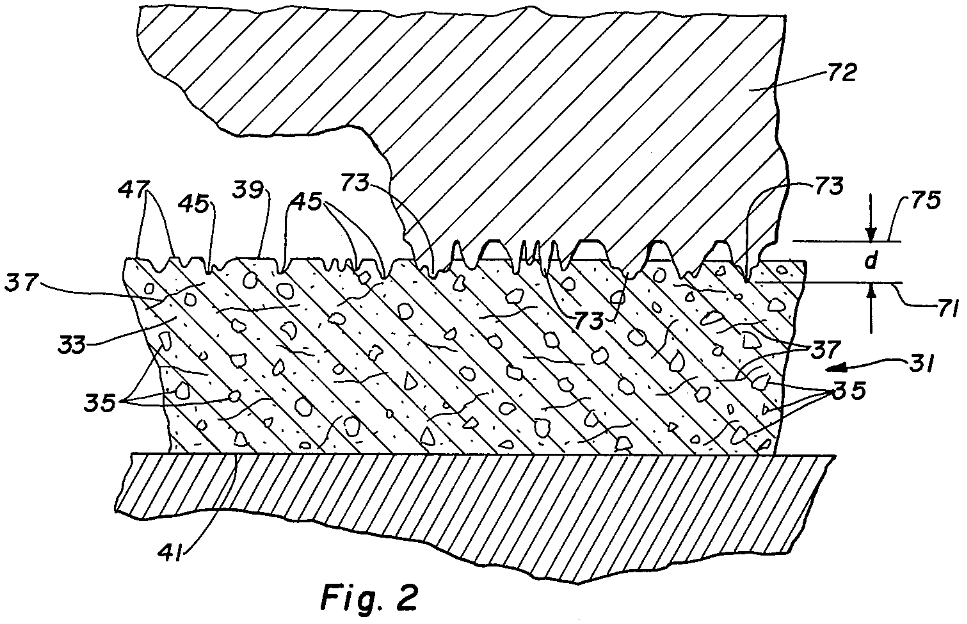
FIG. 2 is an enlarged, fragmentary side elevational view, a cross-section, of the product of FIG. 1, and a rotary embossing die and support surface.

Referring now to FIGS. 1 and 2, the branded wood based composition board product of the present invention can be set forth in more detail. Composition board, generally designated 31, can be seen to be formed with a body 33 having wood based components, such as particulate components 35 and/or fiber components 37, which are held together by binder means which combines with the cellulose to fill the interstices between the particulate and fibrous components. At least one of the outer surfaces 39 and 41 of the board is formed as a relatively hard and usually smooth surface. As used herein, the expression "relatively hard" shall mean a surface which exhibits a hardness which is greater than conventional lumber, and hardboard, fiberboard and particleboard each are conventionally manufactured with a surface hardness which is greater than conventional lumber building materials. The product of the present invention is further formed with an intricate pattern, generally designated 43 of recesses 45 in one of outer surfaces 39 and 41, in this case surface 39. In order to provide a decorative effect and more particularly to enable simulation of the darkened wood grain patterns of decorative woods, substantially all of the recesses 45 are charred to produce a discolored appearance, as compared to the appearance of the outer surface 47 intermediate the recesses. The charring of recesses 45 causes them to normally be darker than the remainder of the outer surface so as to simulate the darkening conventionally found in wood grain patterns. As will be appreciated, other intricate patterns can be formed in one of surfaces 39 and 41, depending upon the decorative effect sought to be achieved.

The product of the present invention can be readily finished by sanding and staining without destroying the pattern 43. Thus, furniture, door skins, panels and other structures can be readily finished to the specifications of individuals so as to match or properly mix with other components. Moreover, if the product of the present invention is scarred or damaged in some way, it is often possible to sand down the scarred surface without eliminating the grain patterns and refinish the product. Charring of the cellulose component of the wood based composition board in recesses formed in the outer surface of the board, therefore, provides improved flexibility in the use of what heretofore had been a building material which was deemed not suitable for decorative uses.

Apparatus and a method suitable for producing the product of the present invention are set forth in my above-referred to copending United States patent application. Briefly, the apparatus is comprised of a rotary branding or embossing machine which has a drum-like element on which is mounted an embossing die. The die is heated, preferably by resistance heating means mounted inside the drum proximate the die, to a temperature well above 500° F. As is indicated in my copending application, the temperature range for maximum life of dies having intricate wood grain patterns is between about 800° to about 900° F. If the problem of die life can be overcome, it is possible to produce the product of the present invention by using die temperatures in excess of 900° F. The relatively hard surface of hardboard, particleboard and fiberboard, however, will cause rapid degradation of conventional steel dies formed from 4135 modified or 4140 carbon steel. Best results are currently being achieved by use of a die heated to between about 850° and about 900° F, with 875° F being perhaps the best operating temperature for the embossing dies. It is believed that in order to form recesses 45 in the hard surface 39 of composition board products, the temperature must be relatively high. It is difficult to compensate for low temperature by increasing die pressure or slowing down the die speed when attempting to brand an intricate pattern of charred recesses into composition board.

Thus, 4' by 8' particleboard panels can be embossed i.e., formed with permanently compressed areas or recesses 45, with a die at 700° F, although the speed of embossing must be reduced to between 200 and 250 panels per hour, and the die will not be hot enough to char the compressed recesses left in the panel. By contrast, when operated at 850° F to 875° F panels of particleboard can be branded at the rate of 450 panels per hour with the pattern of permanently compressed recesses being charred or discolored. Hardboard panels typically can be branded at a rate of about 200 panels per hour at a temperature of 900° F with the recesses being charred and darkened with respect to the normal surface color of the hardboard.

It is believed that if stainless steel dies were employed, higher operating temperatures of the dies could be used to produce the product of the present invention at greater speeds and/or with less pressure.

Since the relatively hard surface of the composition boards which form the body of the product of the present invention requires high branding die temperatures, there is a problem of possible charring or discoloration of the areas 47 between recesses 45. As will be appreciated, if surfaces 47 intermediate the recesses become charred, the net effect is that the outer surface will be embossed with a pattern of recesses, but the recesses will not be visually distinguishable by color from the background surface. Additionally, composition boards which are to be branded to produce the product of the present invention are typically manufactured to a thickness tolerance of about 0.25 millimeters. Thus, over a width or length of a board, a variation in thickness of 0.25 millimeters may be experienced. In order to insure complete branding or formation of charred recesses in the composition board and to reduce the incidence of charring of surfaces 47 intermediate the recesses 45, it has been found to be preferable to form the branding die with a pattern depth of at least about 1.00 millimeters.

As may be seen in FIG. 2, the nominal outside diameter 71 of embossing die 72 is etched to a depth *d* of at least 1.00 millimeters from the nominal inside diameter 75 of the die. It is further preferable that the depth *d* be about 1.5 millimeters. During the branding step, die 72 is preferably urged into the top surface 39 of the composition board to about one-half the depth of the pattern defining protrusions on the die. For a die having a depth *d* of about 1.5 millimeters, the die will be set to have an interference or depth of penetration of about 0.65 millimeters. Since the panels will vary in thickness by plus or minus 0.125 millimeters, the depth of penetration may range between 0.53 to about 0.78 millimeters. This depth of penetration insures branding of the pattern of recesses into the panel without charring of the wood intermediate the pattern.

The branded composition board product of the present invention, therefore, is a high strength, low cost building material that can be incorporated into a variety of structures which requires decorative surface finishes. This enables hardboard, fiberboard and particleboard to be substituted into numerous products in place of the dwindling supply of natural lumbers having desirable grain patterns.

What is claimed is:

1. A wood based composition board product for use in the fabrication of articles such as furniture, doors, panels and the like including a solid body formed from wood based components held together by binder means and having a relatively hard outer surface, wherein the improvement in said composition board product is comprised of:

said outer surface being permanently compressed in selected areas to form an intricate pattern of recesses therein, said pattern of recesses being formed as a wood grain simulating pattern extending over substantially the entire area of said outer surface, and substantially all of said recesses being charred to produce a discolored appearance as compared to the color of said outer surface intermediate said recesses.

2. The building product as defined in claim 1 wherein, said solid composite body is formed as hardboard.

3. The building product as defined in claim 1 wherein, said solid composite body is formed as particleboard.

4. The building product as defined in claim 1 wherein, said solid composite body is formed as fiberboard.

* * * * *